June 28, 1927.
W. B. FAGEOL
1,633,776
AUTOMOBILE BRAKE
Filed June 18, 1923
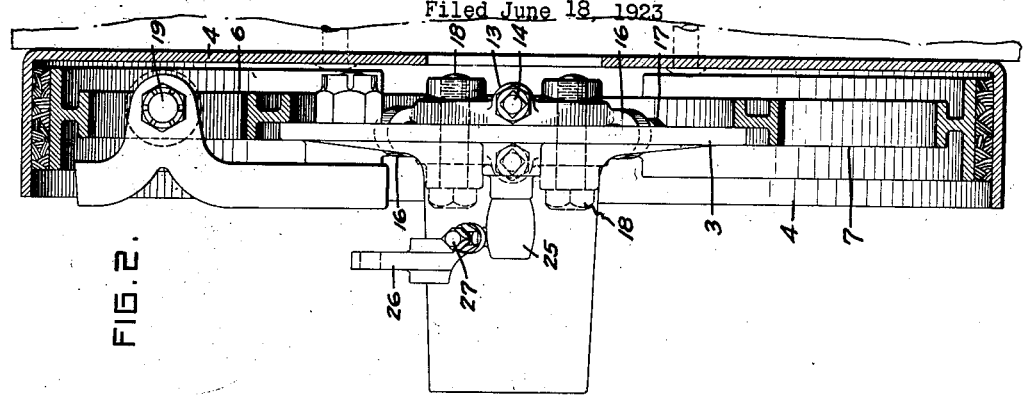
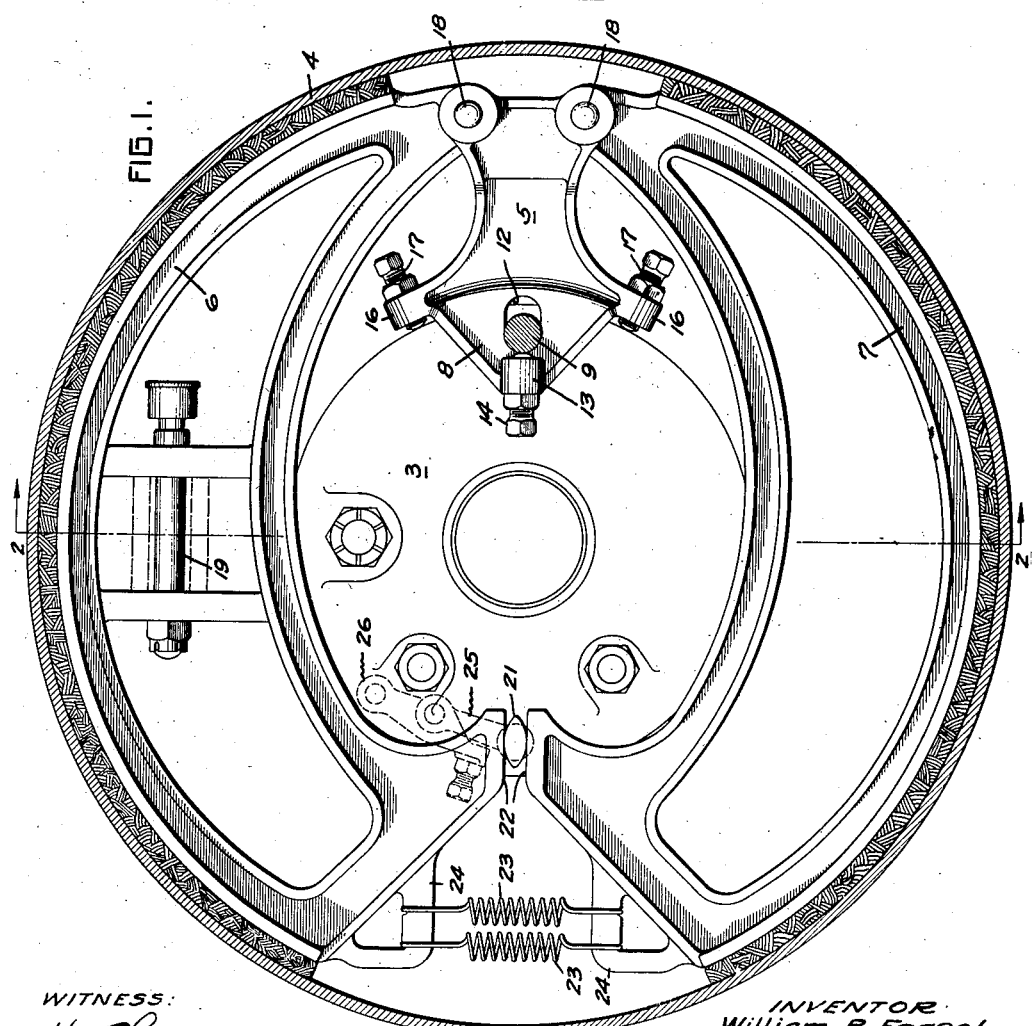
WITNESS:
H. Sherburne
INVENTOR
William B. Fageol
BY
White Prost & Evans
his ATTORNEYS.

Patented June 28, 1927.

1,633,776

UNITED STATES PATENT OFFICE.

WILLIAM B. FAGEOL, OF OAKLAND, CALIFORNIA, ASSIGNOR TO ROLLIE B. FAGEOL, OF OAKLAND, CALIFORNIA.

AUTOMOBILE BRAKE.

Application filed June 18, 1923. Serial No. 646,028.

The invention relates to automobile brakes and particularly to brakes to be used on a very popular type of inexpensive automobile which is now sold in extremely large quantities.

An object of the invention is to provide a brake for replacing the brake with which such automobile is at present equipped without otherwise changing or altering the axle housing structure.

Another object of the invention is to provide an enlarged brake for automobiles of this type whereby a greater braking effect may be produced.

Another object of the invention is to provide means for adjusting the brake shoes with respect to the brake drum so that the shoes may be positioned concentrically with respect to the drum.

Another object of the invention is to provide means for operating the brakes by either the foot lever or the hand lever with which the automobile is at present equipped.

The invention possesses other advantageous features, some of which, with the foregoing, will be set forth at length in the following description, where I shall outline in full, that form of my invention which I have selected for illustration in the drawings accompanying and forming part of the present specification. In said drawings I have shown one form of brake embodying my invention, but it is to be understood that I do not limit myself to such form, since the invention as set forth in the claims, may be embodied in a plurality of forms.

Referring to said drawings:

Figure 1 is a vertical section through the brake drum, showing the brake of my invention.

Fig. 2 is a vertical section taken on the line 2—2, Fig. 1.

The brake of my invention is particularly adapted to be used for replacing the brake with which a certain small type of automobile is equipped by the manufacturer. The brakes of my invention are larger in diameter, so that a larger braking surface is produced, thereby increasing the braking effect. The brake of my invention is applicable to the rear axle housing of the automobile without mutilating the housing in any manner, so that if desired, the brake of my invention may be removed and the original brake replaced.

This automobile, as produced by the manufacturer, is provided with a rear axle housing 2, which is provided on its ends with flanges 3 on which the brake shoes are mounted. In acordance with my invention, I remove these brake shoes and the original brake drum and substitute therefor the brake of my invention. The brake drum 4 of my invention is larger in diameter than the original brake drum and is secured to the wheel in the same manner as the original brake drum is secured.

The brake of my invention comprises a bracket 5 which is secured to the flange 3 and which forms the bearing or support for one end of each of the two brake shoes 6—7. The bracket 5 is provided with two ears 8 which lie on opposite sides of the flange 3 and the bracket is held in place on the flange 3 by a bolt 9 passing through the flange and through elongated apertures 12 in the bracket. Formed on the inner end of each arm 8 is a boss 13 in which there is disposed a set-screw 14 which bears against the bolt 9. Formed in that part of the bracket which lies adjacent the periphery of the flange are bosses 16, in each of which there is disposed a set screw 17 which bears against the periphery of the flange. The set screws 14 and 17 serve to position the bracket with respect to the flange and also to hold the bracket securely in adjusted position. By turning one of the set screws 17 in one direction and the other set screw 17 in the opposite direction the bracket may be adjusted to move its outer end up or down, thus varying the position of the fulcrums of the brake shoes 6 and 7, with respect to the flange. These fulcrums may be moved outwardly or inwardly radially by adjustment of the two set screws 17 in one direction and the set screw 14 in the opposite direction. Thus the fulcrums of the brake shoes may be adjusted radially and circumferentially with respect to the flange 3, so that the brake shoes will be concentric with the brake drums 4. The bracket 5 extends outwardly radially from the flange and the fulcrums 18 of the brake shoes occur in the outer portion of the bracket so that the brake shoes of larger diameter than the original brake shoes are properly mounted within the larger brake drums.

The brake shoes are skeleton in form, having a large opening therein, to reduce the weight of the shoes. The upper brake shoe 6 is preferably designed to accommodate a perch or fulcrum 19 for a type of shock absorber which is largely used in connection with automobiles of this type.

These automobiles are originally provided with a brake actuating cam 21 which is journalled in the flange 3 and the brake shoes 6 and 7 are provided with flat surfaces 22 which are in contact with the cam. These surfaces 22 are spaced inwardly a considerable distance from the periphery of the shoes and the ends of the shoes which are remote from the fulcrums 18 are inclined inwardly from the periphery to the faces 22. The faces 22 are held in contact with the cam 21 by springs 23 which are secured or attached to ears 24 formed on the inclined end of the shoes. These springs 23 were part of the structure of the original brake.

Secured to or formed integral with the cam 21 is a lever arm 25 to which the brake actuating rods are attached in the original construction. With the brake drum made larger, it is advisable to increase the length of this arm so that a greater pressure may be exerted by the cam, and this is accomplished by providing an extension arm 26, which engages the arm 25 and extends beyond the end thereof. The extension arm 26 is provided with a bolt hole which registers with the eye in the arm 25 and a bolt passing through said eye connects the two arms together. The arm 26 is provided with an adjusting screw 27 which engages the arm 25 adjacent its fulcrum to position the arm 26 with respect to the arm 25 and to adjust the tension of the brake actuating rod.

I thus provide an effective braking system for automobiles of this type in which the operation of the brake levers causes the application of large surface brake shoes to a large brake drum, thus producing a large braking surface. By virtue of the adjustment of the bracket 5 the fulcrums 18 of the brake shoes may be positioned so that the brake shoes are concentric with the brake drum, thereby insuring the maximum braking effect for the applied pressure.

I claim:—

1. The combination with a rear axle and its housing which housing is provided on its end with a flange, a brake actuating cam journalled in said flange, a wheel associated with the axle and a brake drum secured to the wheel of a bracket rigidly secured to said flange and extending radially therefrom, means for adjusting the position of the bracket with respect to the flange and brake shoes pivoted to the bracket and engaging said cam.

2. The combination with a rear axle and its housing which housing is provided on its end with a flange, a brake actuating cam journalled in said flange, a wheel associated with the axle and a brake drum secured to the wheel, of a bracket attached to the flange, means for adjusting the bracket radially with respect to the flange and brake shoes pivoted to the bracket and engaging said cam.

3. The combination with a rear axle and its housing which housing is provided on its end with a flange, a brake actuating cam journalled in said flange, a wheel associated with the axle and a brake drum secured to the wheel, of a bracket rigidly attached to the flange, means for adjusting the bracket circumferentially with respect to the flange and brake shoes pivoted to the bracket and engaging said cam.

4. The combination with a rear axle and its housing which housing is provided on its end with a flange, a brake actuating cam journalled in said flange, a wheel associated with the axle and a brake drum secured to the wheel, of a bracket attached to the flange, means for adjusting the bracket radially and circumferentially with respect to the flange and brake shoes pivoted to the bracket and engaging said cam.

5. The combination with a rear axle and its housing which housing is provided on its end with a flange, a brake actuating cam journalled in said flange, a wheel associated with the axle and a brake drum secured to the wheel, of a bracket secured to the flange and extending radially therefrom, means for adjusting said bracket radially and circumferentially with respect to said flange, brake shoes of larger diameter than the flange pivoted to the bracket at points spaced from the flange, and cam engaging surfaces on the shoes spaced inwardly from the periphery of the shoes.

6. The combination with a rear axle and its housing which housing is provided on its end with a flange, a brake actuating cam journalled in said flange, a wheel associated with the axle and a brake drum secured to the wheel, of a bracket rigidly secured to the flange and extending radially therefrom, means for adjusting said bracket radially and circumferentially with respect to said flange, brake shoes of larger diameter than the flange pivoted to the bracket at points spaced from the flange, cam engaging surfaces on the shoes spaced inwardly from the periphery thereof, ears on the shoes between the said surfaces and the periphery and a spring engaging said ears.

7. The combination with a rear axle and its housing which housing is provided on its end with a flange, a brake actuating cam journalled in said flange, a wheel associated with the axle and a brake drum secured to the wheel, a bracket secured to the flange, skeleton brake shoes of larger diameter than the flange pivoted to the bracket and engaging the cam and a shock absorber support formed in one of the skeleton brake shoes.

8. The combination with a rear axle and its housing, which housing is provided on its end with a flange, a wheel mounted on the rear axle, a brake drum secured to the wheel in a manner to circumscribe said housing flange, a bracket interposed between the outer circumference of the housing flange and the inner circumference of the brake drum, means for providing universal adjustment of said bracket in a plane parallel to the flange, a pair of brake shoes disposed within said brake drum and pivoted by their one ends to said bracket, an operating cam disposed between the opposite ends of said brake shoes, and resilient means for holding said opposite ends in constant engagement with the faces of said cams.

9. The combination of a rear axle and its housing, which housing is provided at its end with a flange, a wheel carried by said axle, a brake drum carried by the wheel and circumscribing said housing, a bolt carried by the flange of the housing and extending parallel to the axle, a bracket mounted on said bolt for oscillatory and radial movement relative thereof, a pair of segmental brake shoes disposed within the brake drum and upon opposite sides of the axle, means for pivotally connecting said brake shoes by their one ends to the outer end of the bracket, means for adjustably setting said outer end of the bracket both by radial and oscillatory movement thereof relative to the bracket bolt, and means for actuating the opposite ends of said shoes to move them toward and away from the braking surface of the drum.

In testimony whereof, I have hereunto set my hand.

WILLIAM B. FAGEOL.